United States Patent [19]

Vine

[11] Patent Number: 5,020,352

[45] Date of Patent: Jun. 4, 1991

[54] ROLLER SCREENING APPARATUS

[75] Inventor: Martin B. Vine, New South Wales, Australia

[73] Assignee: M. J. Vine Enterprises Pty. Ltd., New South Wales, Australia

[21] Appl. No.: 334,956

[22] PCT Filed: Sep. 28, 1987

[86] PCT No.: PCT/AU87/00332

§ 371 Date: May 19, 1989

§ 102(e) Date: May 19, 1989

[87] PCT Pub. No.: WO88/02287

PCT Pub. Date: Apr. 7, 1988

[30] Foreign Application Priority Data

Sep. 26, 1986 [AU] Australia .................. PH8211

[51] Int. Cl.$^5$ .................................... B21B 27/06
[52] U.S. Cl. ............................. 72/84; 72/102; 72/703
[58] Field of Search .............. 72/102, 703, 84, 85; 29/DIG. 66, DIG. 90

[56] References Cited

U.S. PATENT DOCUMENTS

| 482,947 | 9/1892 | Hope | 72/102 |
| 878,071 | 2/1908 | Laing | 72/85 |
| 1,414,574 | 5/1922 | Laing | 72/703 |
| 1,982,209 | 11/1934 | Gary | 72/102 |
| 3,292,403 | 12/1966 | Lewis | 72/84 |

Primary Examiner—Robert L. Spruill
Attorney, Agent, or Firm—Irell & Manella

[57] ABSTRACT

An apparatus, based on a conventional lathe, for the screening of ink transfer rollers including a rotatable screen forming tool rotably held above the ink transfer roller by a pivoted arm, is disclosed. The arm pivots about an axis parallel with the axis of rotation of the roller and to one side thereof with a damping device extending from the arm on a side opposite the pivot to a base. The base transverses along the lathe bed and rigidly supports a post to which the arm pivot is attached for adjustable height. The arm also includes a variable weight for adjusting the force of the tool upon the roller.

13 Claims, 3 Drawing Sheets

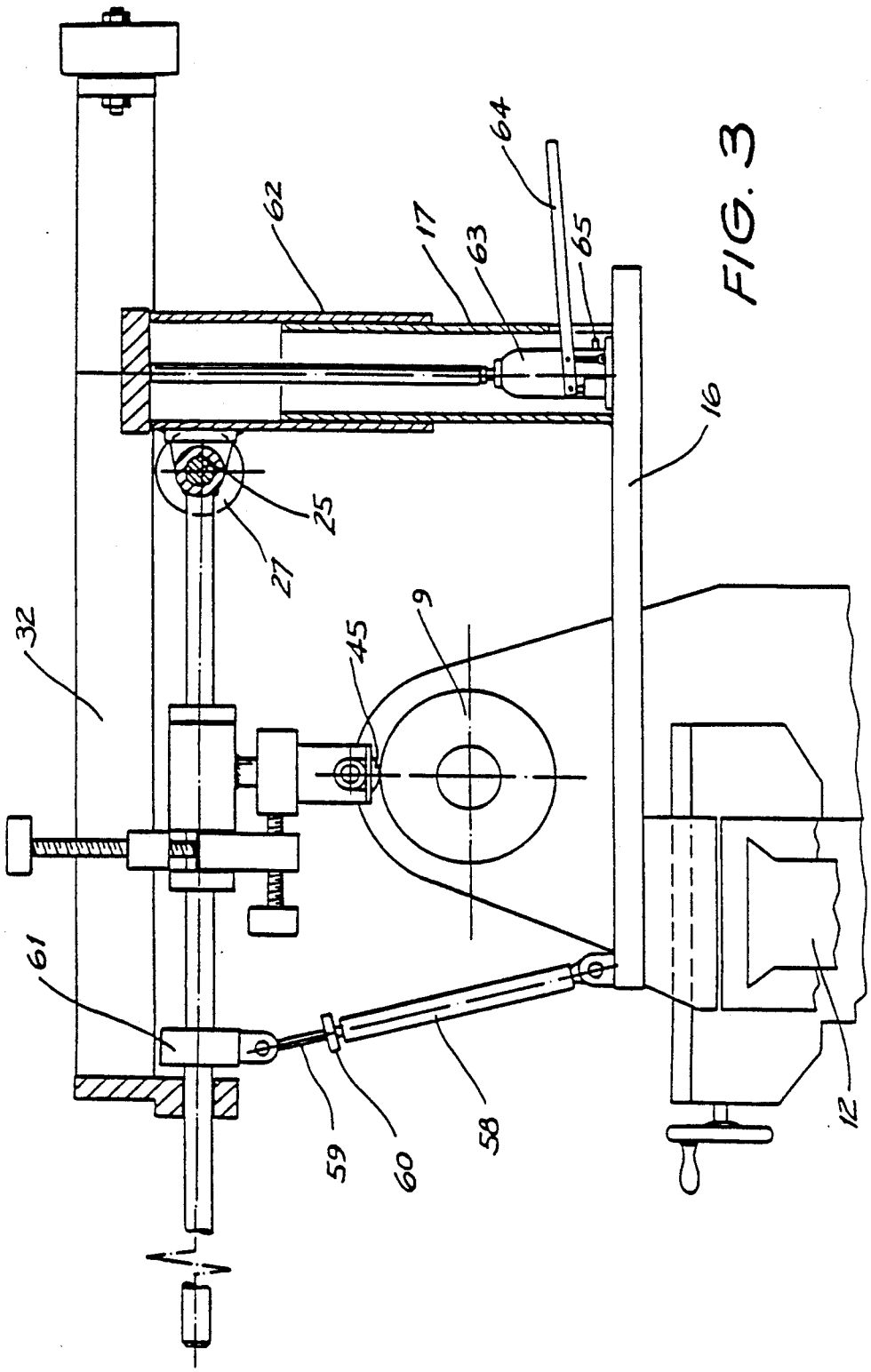

ROLLER SCREENING APPARATUS

The present invention relates to means for the screening of ink transfer rollers and to tool support means for use in such apparatus

BACKGROUND ART

In the process of flexographic printing, or flexography, ink is transferred by an ink transfer roller from an ink source to a flexible printing plate or roller. The ink transfer roller is provided on its cylindrical surface with an array of small depressions or indentations called cells. The array of cells on the surface of the ink transfer roller is known as a screen. The screen receives and holds ink from a supply source, a scraper blade or a rubber roller removes excess ink from the surface of the roller, and the ink from the screen is then transferred, directly or indirectly to the flexographic printing plate or roller.

The ink transfer rollers are produced by forming a roller with a smooth cylindrical surface of a suitable material, usually a metal such as copper, and then forming a screen thereon. The screen is normally formed by rotating the ink transfer roller, bringing a rotatable screen forming tool into contact with the surface of the roller such that it rotates about an axis substantially parallel to the axis of the transfer roller and moving the rotating tool along the roller such that a helical path of cells is formed with adjacent turns of the helix in register.

The present invention provides an alternative to the conventional apparatus for the screening of ink transfer rollers i.e. forming a screen of cells on the cylindrical surface of the ink transfer roller.

DISCLOSURE OF INVENTION

In one broad form the present invention provides a tool support assembly comprising:
- a support attachment adapted to be secured to a roller screening apparatus having a notional axis of rotation about which an ink transfer roller may be rotated;
- a tool support arm orientated relative to the support attachment so as to be transverse of and above the axis of rotation when attached thereto;
- a pivot between the support arm and support attachment with a pivot axis normal to the arm and substantially parallel to the rotating axis;
- a tool holder secured to the support arm and fixably traversible therealong;
- a screen forming tool held in the tool holder and rotatable about a tool axis substantially parallel to the pivot axis; and
- a vibration damping means secured at one end to the arm and secured at an opposite end to the support attachment.

In a further form the invention provides a screening apparatus including a horizontal longitudinal bed, a rotating means adapted to hold an ink transfer roller for rotation about a substantially horizontal axis of rotation positioned above, and aligned with, the longitudinal axis of the bed and the above described support assembly secured to the bed for controlled longitudinal movement therealong. Conveniently the apparatus is a conventional lathe with the support assembly attached to a carriage of the lathe bed.

The vibration damping means preferably comprises a strut or bar disposed between the lathe and the arm and inclined away from the roller. The strut being held in place by a resilient connection member, such as a shock cord, extending between the strut and a point on the arm closer to its first point than is its engagement with the strut. This arrangement serves to dampen any "chatter" of the tool. Any upward moment of the tool will cause the arm to rise and the tension in the resilient connection member will pull the upper end of the strut along the underside of the arm slightly towards the tool holder. As the tool drops under gravity the upper end of the strut will slide back along the underside of the arm. This arrangement preferably includes a stop member on the arm which will be engaged by the upper end of the strut if the tool were to drop more than a predetermined amount. The stop member is preferably so set that if the tool were to run off the end of a roller the tool would not drop so far that the tool holder would engage with the roller and mar its surface.

Alternatively, the vibration damping means comprises a telescopic fluid damper, such as a proprietary shock absorber, extending between a portion of the arm distal of the pivot and the support attachment. The inner telescopic member includes a clamp slidable therealong and lockable in any position. The clamp is positioned so that the tool can only drop to a limited position should it run off the end of a roller while the screen rolling operation is being undertaken. The position is selected so that the tool holder would not engage with the roller and mar its surface.

In yet a further aspect the present invention consists in a tool holder for the screening of ink transfer rollers comprising a support member including a pair of supporting arms, a recess in a lower end of each of the arms, an annular bearing member removably positioned in each of the recesses, engagement means disposed in each recess and adapted to restrain the respective bearing member, or a part thereof, from rotational or axial movement relative to the respective one of the arm, an engraving tool having axle means extending through each of the said bearing members and releasable holding means holding each bearing means in place in a respective one of the recesses. The bearing member may be a hardened steel sleeve or alternatively a ball or needle bearing. The engagement means preferably comprises a pin extending into the recess and receivable in a hole in the outer surface of the bearing member.

In a still further aspect the present invention consists in tool support means for connection to apparatus for the screening of ink transfer rollers, comprising an arm having pivot means adapted to be mounted on such apparatus, a tool holder disposed on the arm and carrying a screen forming tool adapted to rotate about an axis substantially parallel to the axis of rotation of the ink transfer roller, and weight carrying means slidably disposed on the arm, the weight carrying means including arm means extending beyond the pivot means and connected to a weight.

In this latter embodiment of the invention support means are preferably provided adjacent the pivot means to support the arms of the weight carrying means. It is particularly preferred that this support means comprises a roller or rollers.

BRIEF DESCRIPTION OF THE DRAWINGS

Hereinafter given by way of example is a preferred embodiment of the present invention described with reference to the accompanying drawings in which:

FIG. 3 is a longitudinal sectional view of a second embodiment of the invention.

BEST MODE OF CARRYING OUT THE INVENTION

Figure 1:
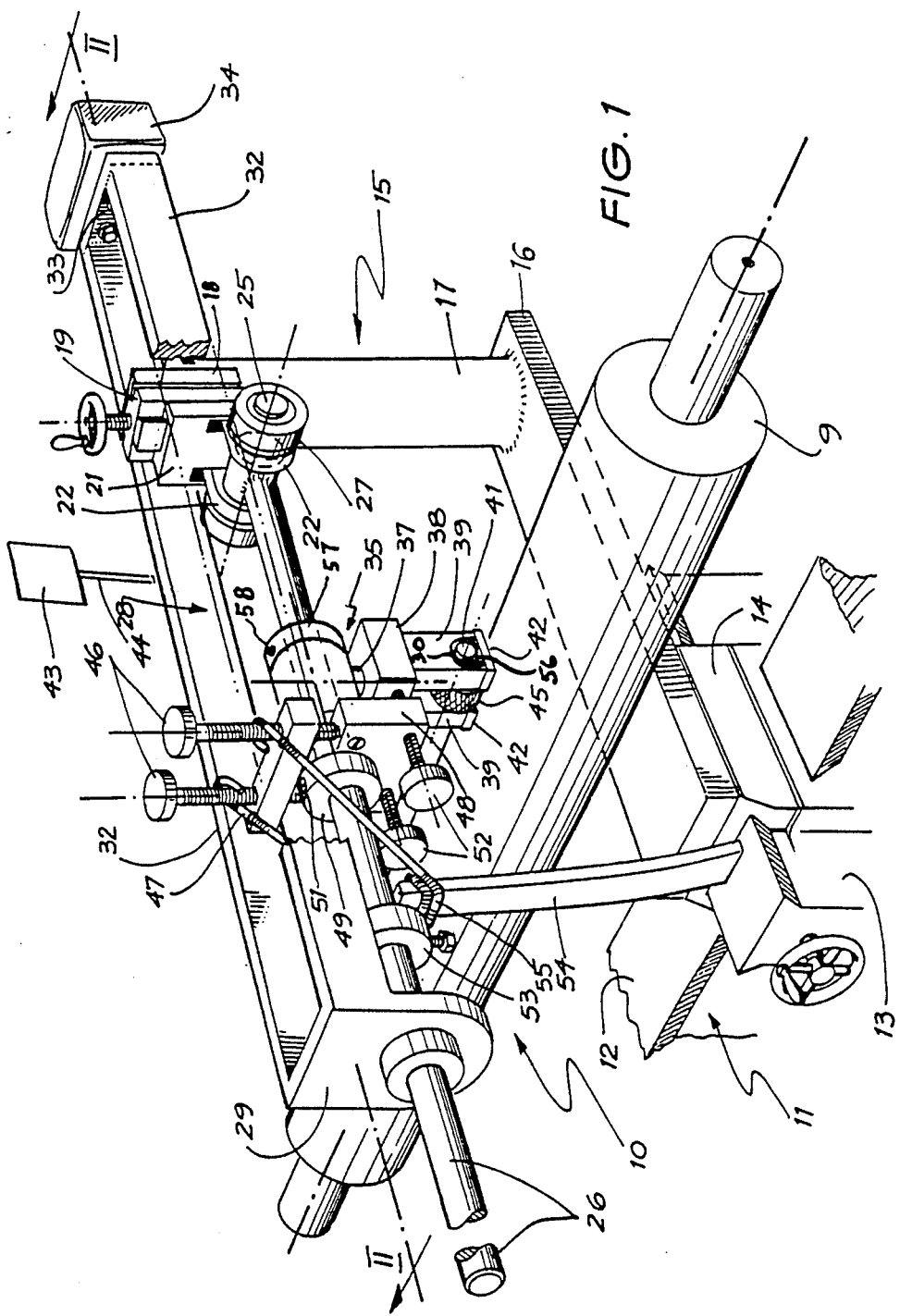
FIG. 1 is a perspective view of a part of an apparatus according to this invention showing tool support means according this invention.
Figure 2:
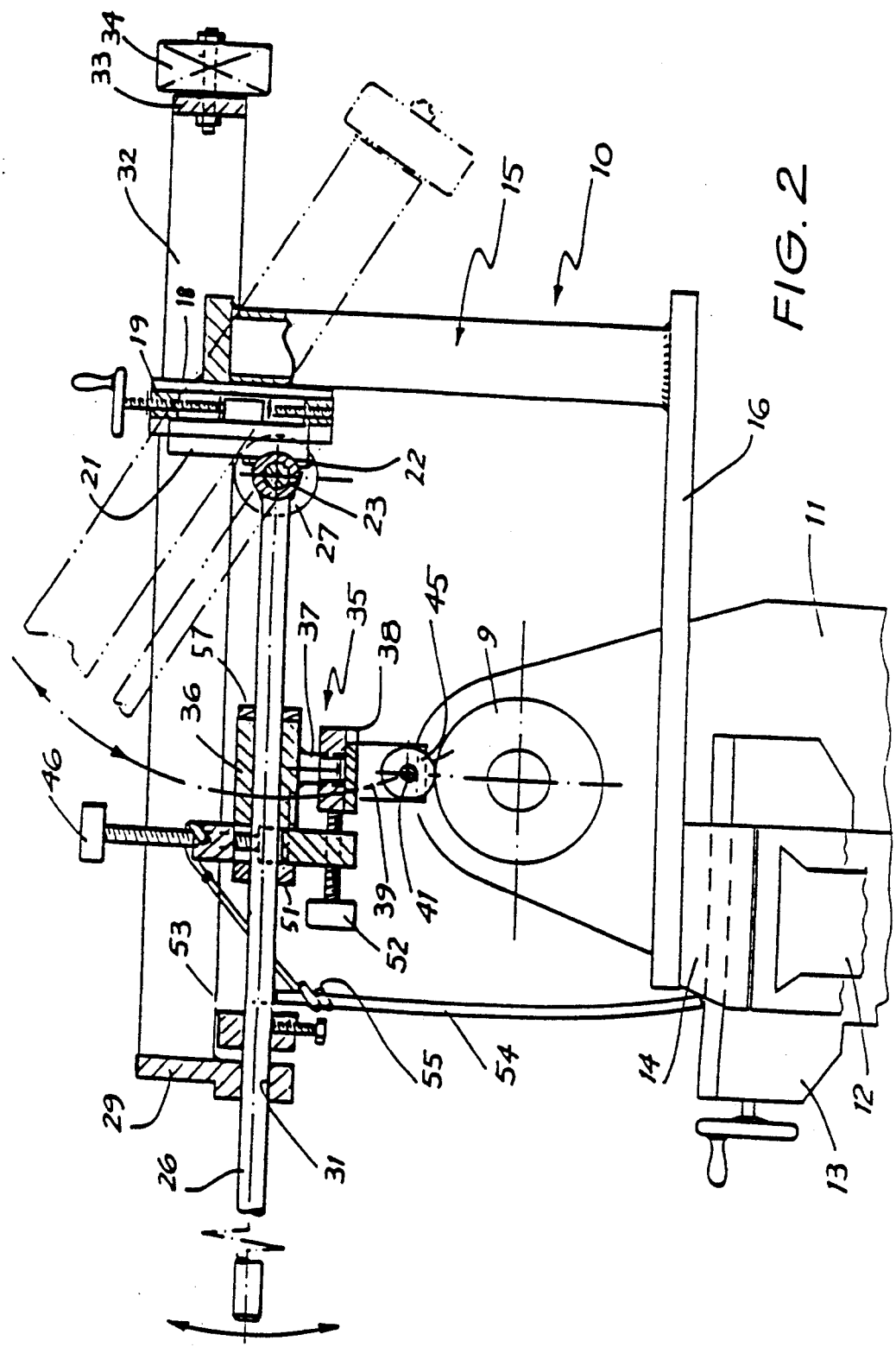
FIG. 2 is a longitudinal sectional view of the apparatus and tool support means along II—II of FIG. 1.

The apparatus 10 is based on a conventional lathe 11 only the bed 12 of which is shown in FIG. 1. A carriage 13 is mounted on the bed 12 and is arranged to move longitudinally along the bed 12. A step 14 is mounted on the carriage 13 and is arranged to move along the carriage 13 at right angles to the axis of the bed 12. The lathe 11 is arranged to support an ink transfer roller 9 with its axis parallel to the axis of the bed 12 and to rotate it about its axis.

The tool support means 15 is mounted on the step 14 and is movable therewith The tool support means 15 comprises a beam 16 which is bolted at one end to the step 14 and which extends at right angles to the bed 12. A post 17 is disposed vertically at the free end of the beam. The upper end of the post 17 carries a vertical plate 18. A screw actuated slide 19 is connected vertically to the side of the plate 18 proximal to the bed 12. A slide plate 21 on the slide 19 is vertically adjusted by the screw actuated slide 19 and has on its face proximal to the bed 12 a pair of bearings 22 which are each provided with a bore 23, the bores 23 being in horizontal axial alignment. A T-shaped rod 24 is pivotably mounted in the bores 23 with a transverse arm 25 projecting through each bore 23 and a long arm 26 extending transversely of the bed 12.

The free end of each of the arms 25 of the T-shaped rod 24 carry a roller bearing 27. Weighting means 28 are disposed on the arm 24 and comprise an end plate 29 having an aperture 31 through which the arm 26 projects, a pair of side plates 32 which extend along and beyond the arm 26 and are connected at their free ends by a further end plate 33 to which is connected a weight 34. The side plates 32 rest on the bearings 27. A locking screw is provided in end wall 29 and is so arranged that on being tightened it will engage with rod 26 to lock the weighting means 28 in place on the arm 26.

A tool carrier 35 is slidably disposed on the arm 26. The tool carrier 35 comprises a cylindrical slide 36 slidably disposed on the arm 26. A boss 37 projects downwardly from the slide 36. An inverted U-shaped tool holder 38 is rotatably disposed on the boss 37. A recess 30 is formed in the free end of each arm 39 of the U-shaped tool holder 38. An annular bearing 56 is provided in each recess and is restrained against axial or rotational movement relative to the recess by a pin (not shown) disposed in the base of the recess 30 and extending radially of a respective one of the axles 41 into a hole (not shown) in the bearing 56. The axles 41 of a screen forming tool 45 extend between the arms 39 and are held in the bearings 56. The bearings 56 are held in the respective recesses 30 in the arms 39 by plates 42. An oil feed container 43 is provided to feed oil through line 44 into each of the recesses to lubricate the axle 41 journalled in the bearing 56. The rotatable screening tool 45 is free to slide in the bearing 56 between the arms 39.

Two collars 49 and 57 carrying radially directed grub screws 51 and 58 are disposed on the arm 26 and serve to position the tool carrier 35 relative to an ink transfer roller 9 mounted in the lathe 11. A bar 47 is welded to collar 49 and carries two adjustment screws 46 through threaded vertical holes on either side of arm 26. The screws 46 bear on block 48 which is screwed to one end of the slide 36. Rotation of the screws 46 cause rotational movement of slide 36, and with it tool 45, about the arm 26. The block 48 is provided with a pair of horizontal holes in which are disposed screws 52. The screws 52 bear against a face of the U-shaped tool holder 39 and cause it, and tool 45, to rotate about the boss 37.

A collar 53 is slidably positioned on the arm 26 between the collar 49 and the end wall 29. A support bar 54 is disposed between the carriage 13 of the lathe 11 and the underside of the arm 26. Generally, the bar 54 contacts the underside of arm 26 adjacent to, but not in contact with, the collar 53. Collar 53 acts as an adjustable stop device to limit the downward movement of the arm 26. This bar 54 is held in place against the underside of the arm 26 by an elastic, resilient, strap 55 which is wrapped around bar 54 and connected at its ends to screws 46. The strap 55 and the bar 54 serve to dampen any vibrations of the arm 26 and the tool 45 mounted thereon relative to the roller 9.

In use when an ink transfer roller 9 which has been replated and turned down to a smooth surface is to be screened it is positioned in the lathe 11. The tool 45 is then positioned correctly relative to the roller 9 by firstly adjusting the height of arm 26 by the use of slide 19, by secondly sliding the step 14 until the tool 45 bears on the top of the roller 9, thirdly screws 46 and 52 are adjusted to get the inclination of the tool correct relative to the roller 9, and fourthly the weight applied to the tool is adjusted by sliding the weighting means along the arm 26. The elastic strap 55 serves, with bar 54, to dampen vibrations of the tool 45 relative to the roller 9 while bar 54 limits the downward movement of the arm 26 particularly when the tool has been traversed along the roller 9 to its end.

Another embodiment of the invention is shown in FIG. 3 and includes an alternative vertical adjusting means. The post 17 attached to the beam 16 has a machined outer surface so as to telescopically accept the outer sleeve 62. Internally of the post 17 and sleeve 62 is disposed a hydraulic jack 63 complete with actuating handle 64 and release valve 65. Actuation of the handle 64 extends the sleeve 62 relative to the post 17 while release of pressure via the valve 65 allows retraction of the two telescopic components 62 and 17. Affixed to the top of the sleeve 62 is the previously described structure supporting the bearings 22 and T-shaped rod 24.

The embodiment of FIG. 3 also includes an alternative damping device to the support bar 54. A clamp 61 is secured to the arm 26 so as to allow it to be rigidly positioned at any point along the arm 26. Extending from the clamp 61 down to the beam 16 is a shock absorber 58. The shock absorber 58 includes a shaft 59 telescopically held within the body of the shock absorber in the conventional manner. A stop collar 60 is fixable in any position along the shaft 59 so as to provide a minimum height stop for the arm 26.

It has been found that the presence of the resilient strap 55 and the movement limiting bar 54, or the alternative shock absorber 58, allows the roller 9 to be rotated faster than would otherwise be possible and allows the tool 45 to be traversed along the roller 9 faster than would otherwise be possible.

It will be recognized by persons skilled in the art that numerous variations and modifications may be made to the invention as described above without departing from the spirit or scope of the invention as broadly described.

I claim:

1. A tool support assembly comprising:
   a support attachment adapted to be secured to a roller screening apparatus having a notional axis of rotation about which an ink transfer roller may be rotated;
   a tool support arm orientated relative to the support attachment so as to be transverse of and above the axis of rotation when attached thereto;
   a pivot between the support arm and support attachment with a pivot axis normal to the arm and substantially parallel to the axis of rotation;
   a tool holder secured to the support arm and fixably traversible therealong;
   a screen forming tool held in the tool holder and rotatable about a tool axis substantially parallel to the pivot axis; and
   a vibration damping means secured at one end to the arm and secured at an opposite end to the support attachment.

2. A tool support assembly as defined in claim 1, wherein the vibration damping means is a fluid damped telescopic shock absorber.

3. A tool support assembly as defined in claim 1, wherein the vibration damping means is a substantially rigid member inclined upwardly and away from the pivot and the one end is resiliently biassed towards the pivot and traversible along at least a portion of the arm.

4. An assembly as defined in claim 3, further including an adjustable stop device restricting movement of the vibration damping means so as to impose a maximum downward limit of the pivotal movement of the arm about the pivot.

5. An assembly as defined in claim 3, further including an adjustable stop device restricting movement of the vibration damping means so as to impose a maximum downward limit of the pivotal movement of the arm about the pivot.

6. An assembly as defined in claim 1, further comprising a height adjusting means providing adjustment of the location of the pivot relative to the support attachment in a direction which is vertical when the support attachment is fixed to the screening apparatus 7. An assembly as defined in claim 6, wherein the height adjusting means comprises two relatively moveable screw driven parts, one part fixed to the pivot and the other part fixed to the support attachment.

8. An assembly as defined in claim 6, wherein the height adjusting means is an hydraulically driven telescopic device with one part having the pivot fixed thereto and extendible in the vertical direction, when fixed to the apparatus, relative to the support attachment.

9. An assembly as defined in claim 1, wherein the tool holder includes a clamp fixable to the arm and at least two screw adjustment means between the clamp and the screen forming tool providing alignment of the tool axis about respective axes parallel to the arm and perpendicular to the arm and pivot axis.

10. An assembly as defined in claim 1, further including an adjustable weighting device adjustably biassing the tool towards the axis of rotation when the assembly is fixed to the screening apparatus.

11. A screening apparatus comprising a substantially horizontal axis of rotation and rotating means concentric therewith adapted to hold an ink transfer roller for rotation about the axis of rotation; a rigid bed spacially fixed relative to the axis of rotation; a support attachment secured to the bed and controllably moveable therealong; a tool support arm extending transversely across, and above, the axis of rotation; a pivot between the support arm and support attachment with a pivot axis normal to the arm and substantially parallel to the axis of rotation; a tool holder secured to the support arm and fixably traversible therealong; a screen forming tool held in the holder and rotatable about a tool axis substantially parallel to the axis of rotation; and a substantially rigid member extending from the arm to a position fixed rigidly relative to the attachment, the rigid member being inclined obliquely upwardly and outwardly from the axis of rotation with the upper end traversible along the arm and resiliently biassed towards the pivot with a stopping device clamped to the arm beyond the rigid member relative to the pivot and fixably positioned so as to limit the downward pivotable movement of the arm.

12. A screening apparatus comprising a substantially horizontal axis of rotation and rotating means concentric therewith adapted to hold an ink transfer roller for rotation about the axis of rotation; a rigid bed spacially fixed relative to the axis of rotation; a support attachment secured to the bed and controllably moveable therealong; a tool support arm extending transversely across, and above, the axis of rotation; a pivot between the support arm and support attachment with a pivot axis normal to the arm and substantially parallel to the axis of rotation; a tool holder secured to the support arm and fixably traversible therealong; a screen forming tool held in the holder and rotatable about a tool axis substantially parallel to the axis of rotation; and an hydraulic telescopic shock absorber extending from the arm distal of the pivot to a position rigidly fixed relative to the attachment, an inner telescopic member including, slidably secured thereto, a clampable stop providing adjustment of the maximum downward rotation of the arm about the pivot.

13. A screening apparatus comprising:
   a substantially horizontal axis of rotation and rotating means concentric therewith adapted to hold an ink transfer roller for rotation about the axis of rotation;
   a rigid bed spatially fixed relative to the axis of rotation; and
   a tool support assembly, said tool support assembly comprising:
   a support attachment adapted to be secured to a roller screening apparatus having a notational axis of rotation about which an ink transfer roller may be rotated;
   a tool support arm orientated relative to the support attachment so as to be transverse of and above the axis of rotation when attached thereto;
   a pivot between the support arm and support attachment with a pivot axis normal to the arm and substantially parallel to the axis of rotation;

a tool holder secured to the support arm and fixably traversable therealong;

a screen forming tool held in the tool holder and rotatable about a tool axis substantially parallel to the pivot axis; and a vibration damping means secured at one end to the arm and secured at an opposite end to the support attachment, wherein the support attachment is secured to the bed for controlled movement therealong, with the support arm extending transversely across and above the axis of rotation and the pivot axis being substantially parallel to the axis of rotation.

* * * * *